(12) United States Patent
Millman et al.

(10) Patent No.: US 6,476,800 B2
(45) Date of Patent: Nov. 5, 2002

(54) METHOD AND APPARATUS FOR ADJUSTING VIDEO REFRESH RATE IN RESPONSE TO POWER MODE CHANGES IN ORDER TO CONSERVE POWER

(75) Inventors: Steven Edward Millman, Spring Valley, NY (US); Kevin Wilson Warren, Fishkill, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,228

(22) Filed: Mar. 23, 1998

(65) Prior Publication Data

US 2002/0075251 A1 Jun. 20, 2002

(51) Int. Cl.[7] ............................. G09G 5/00; G06E 1/26
(52) U.S. Cl. ...................................... 345/212; 713/322
(58) Field of Search ............................ 345/98, 99, 100, 345/204, 211, 212, 213, 214, 501; 713/300, 320, 322, 323, 324, 340

(56) References Cited

U.S. PATENT DOCUMENTS

| | | | | |
|---|---|---|---|---|
| 5,138,305 A | * | 8/1992 | Tomiyasu | 345/3.1 |
| 5,548,765 A | * | 8/1996 | Tsunoda et al. | 713/322 |
| 5,619,707 A | * | 4/1997 | Suboh | 713/322 |
| 5,721,935 A | * | 2/1998 | Deschepper et al. | 713/323 |
| 5,765,001 A | * | 6/1998 | Clark et al. | 713/340 |
| 5,796,391 A | * | 8/1998 | Chiu et al. | 345/204 |
| 5,799,198 A | * | 8/1998 | Fung | 713/323 |
| 5,822,599 A | * | 10/1998 | Kidder et al. | 345/214 |
| 5,832,286 A | * | 11/1998 | Yoshida | 713/324 |
| 5,845,137 A | * | 12/1998 | Tanaka | 713/323 |
| 5,860,016 A | * | 1/1999 | Nookala et al. | 713/324 |
| 5,867,140 A | * | 2/1999 | Rader | 345/211 |
| 5,886,689 A | * | 3/1999 | Chee et al. | 345/212 |
| 5,987,613 A | * | 11/1999 | Busch et al. | 713/300 |
| 5,991,883 A | * | 11/1999 | Atkinson | 713/300 |
| 6,035,408 A | * | 3/2000 | Huang | 713/320 |
| 6,160,561 A | * | 12/2000 | Klein | 345/536 |

* cited by examiner

*Primary Examiner*—Steven Saras
*Assistant Examiner*—Paul A. Bell
(74) *Attorney, Agent, or Firm*—McGinn & Gibb, PLLC

(57) ABSTRACT

The present invention provides for a software routine executable by an image display system that controls at least one video timing signal (for example, the pixel clock signal) supplied to a display subsystem. More specifically, the software routine, adjusts the video timing signal in response to detection that the system is switching between power modes. The software routine preferably updates the video timing signal such that the system conserves power in response to detection that the system is switching from AC-powered operation to limited DC-powered operation.

18 Claims, 2 Drawing Sheets

METHOD AND APPARATUS FOR ADJUSTING VIDEO REFRESH RATE IN RESPONSE TO POWER MODE CHANGES IN ORDER TO CONSERVE POWER

BACKGROUND OF THE INVENTION

1. Technical Field

The invention relates generally to image display systems, and, more particularly, to controlling the refresh rate of image display systems.

2. Description of the Related Art

In order to control the display of image frames on a display device, image display systems typically rely on three video timing signals:

1) a pixel clock that represents transitions between pixels that make up an image frame;
2) a horizontal synchronization (HSYNCH) signal that represents transitions between lines of pixels that make up the image frame; and
3) a vertical synchronization (VSYNCH) signal that represents transitions between image frames.

The HSYNCH and VSYNCH signals are typically derived by dividing down the pixel clock signal by predetermined factors. For example, the HSYNCH signal may be derived by dividing down the pixel clock signal by the number of pixels that make up a scan line on the display device, and the VSYNCH signal may be derived by dividing down the HSYNCH signal by the number of lines that make up an image frame on the display device.

The refresh rate of an image display system represents the frequency with which an image frame is re-drawn by the display device of the system. The refresh rate of the system is typically controlled by varying the frequency of the pixel clock signal.

Current computer systems provide the capability of controlling the refresh rate of the display controller hardware through display setup utilities. Typically, data that defines a set of predetermined modes of operation of the display controller hardware is stored in the video/display BIOS of the computer system. During system setup, data defining an active mode is selected and written to the display controller hardware.

In general, when power consumption is not an issue, the highest possible refresh rate for given display controller hardware is preferable. In typical systems today, the highest possible refresh rate for a given display controller is in the range from 60 Hz to 85 Hz.

Higher refresh rates are preferable over lower refresh rates because, if the refresh rate is too slow, moving or animated images appear to jump from frame to frame instead of moving in a continuous motion.

For many applications, like word processing, spread sheets, etc. little motion or animation is involved. The screen may only need to be updated each time a character is entered by the user. In this scenario, the only noticeable difference if the refresh rate is lowered is that the mouse pointer motion will appear slow to respond.

SUMMARY OF THE INVENTION

The present invention provides for a software routine executable by the image display system that controls at least one video timing signal (for example, the pixel clock signal) supplied to the display subsystem. More specifically, the software routine, adjusts the video timing signal in response to detection that the image display system is switching between power modes. The software routine preferably updates the video timing signal such that the image display system conserves power in response to detection that the image display system is switching from AC-powered operation to limited DC-powered operation.

DETAILED DESCRIPTION OF THE INVENTION

Figure 1:
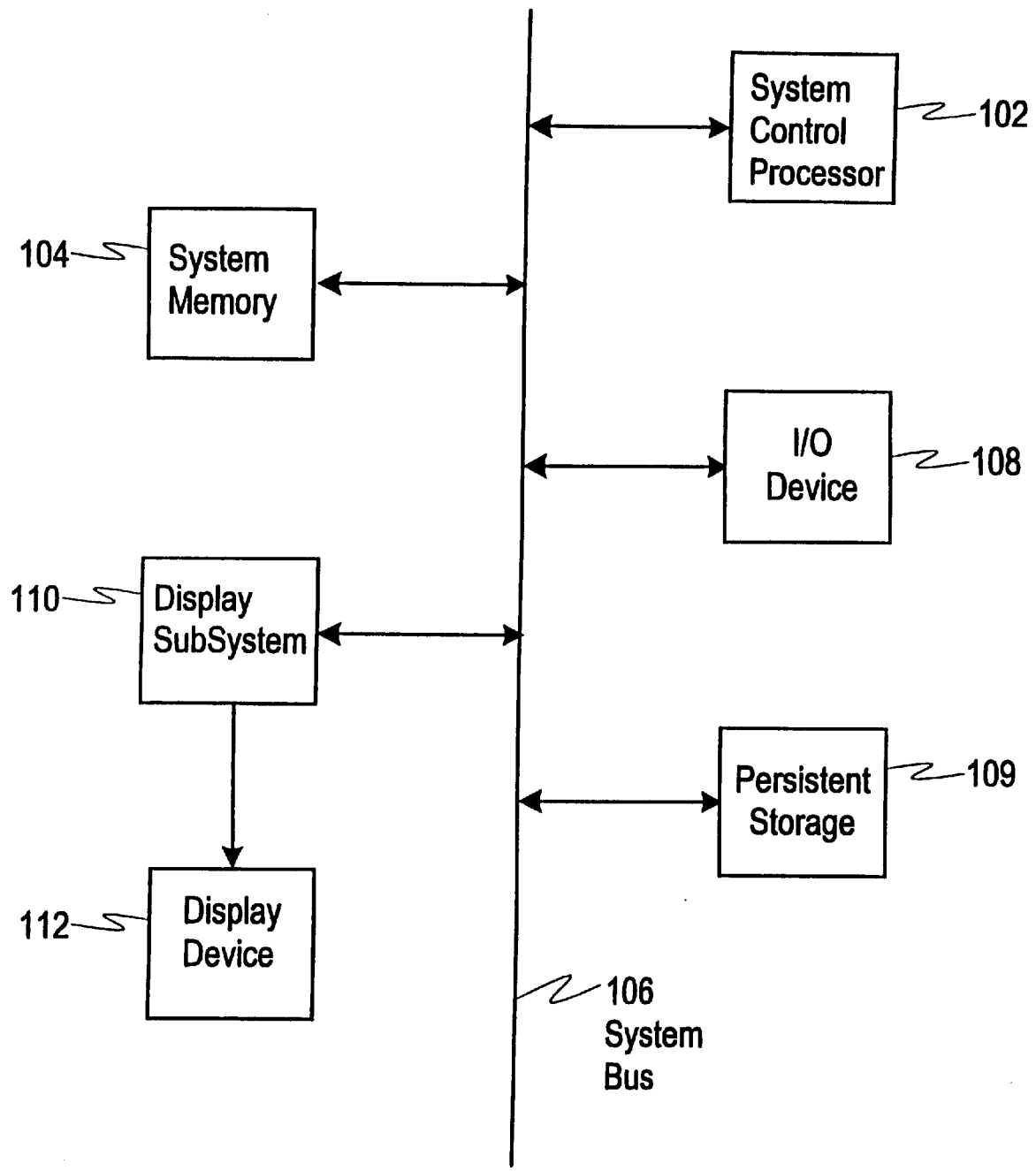
FIG. 1 is functional block diagram of an image display system.

The overall architecture of the present invention is depicted in FIG. 1. As shown, an image display system 100 includes a system control processor 102 which is coupled to a system memory 104 via a system bus 106. The system memory 104 consists of random access memory that stores the operating system of the image display system 100 and application software, if needed. The operating system and application software are typically loaded into the system memory 104 from persistent storage 109, such as a fixed disk drive or other non-volatile memory. In addition, the operating system and application software may be loaded into system memory 104 from network resources via a communication adapter (not shown) such as a modem, a local area adapter network, a wide area adapter or other communication device. Input/output (I/O) devices 108 interface to the system control processor 102 via the system bus 106. The I/O devices 108 may include a keyboard, template or touch pad for text entry, a pointing device such as a mouse, trackball, spaceball or light pen for user input, and speech recognition for speech input.

The operating system controls the allocation and usage of the hardware resources of the image display system 100, and is the foundation on which the application software is built. The application software works in conjunction with the operating system and user input to perform specific tasks. Examples of application software include a word processor, spreadsheet program, web-browser, video player, 3-D modeling and navigation software, 3-D game software, etc.

The image display system 100 includes a display subsystem 110 that interfaces to the system control processor 102 and the system memory 104 via the system bus 106. Generally, the display subsystem 110 operates to generate images for display on the display device 112 based upon commands generated by the system control processor 102 and transferred to the display subsystem 110 via the system bus 106. For descriptive purposes, the system bus 106 is described above as a single bus; however, it is readily apparent to one skilled in the art that the system bus may comprise one or more buses (which may utilize different bus protocols) depending upon the architecture and design of the image display system 100.

The operating system includes a device driver that is specific to the display subsystem 110. The device driver provides a programming interface that is used by other parts of the operating system and application software to transfer commands and data to the display subsystem 110 in order to generate images for display on the display device. More specifically, the operating system and/or application software works in conjunction with the device driver to load data (such as text data, bit-map pixel data, and three-dimensional graphics data) into system memory 104 in a form suitable for use by the display subsystem 110. In addition, the operating system and/or application software works in conjunction with the device driver to generate commands associated with the data in a form suitable for use by the display subsystem 110, and transfers the commands to the display subsystem 110 via the system bus 106. The display subsystem 110 performs the operations dictated by the commands to generate image data for display on the display device. The commands transferred to the display system may be, for example, a command to draw a line, a command to draw a window, a command to render a bit-map image, a command to render a three dimensional image, a command to decode a video stream, etc. The display device 112 may utilize raster scan techniques (such as a CRT display device) or array switching techniques (such as liquid crystal/TFT display device) to display the pixels.

The display subsystem 110 of the present invention as described below may be implemented in hardware as, for example, a gate array or a chip set that includes at least one programmable sequencer, memory, integer processing unit (s) and floating point unit(s), if needed. In addition, the display subsystem 110 may include a parallel and/or pipelined architecture. In the alternative, the display subsystem 110 may be implemented in software together with a processor. The processor may be a conventional general purpose processor, a part of the host processor 102, or part of a co-processor integrated with the host processor 102.

Figure 2:
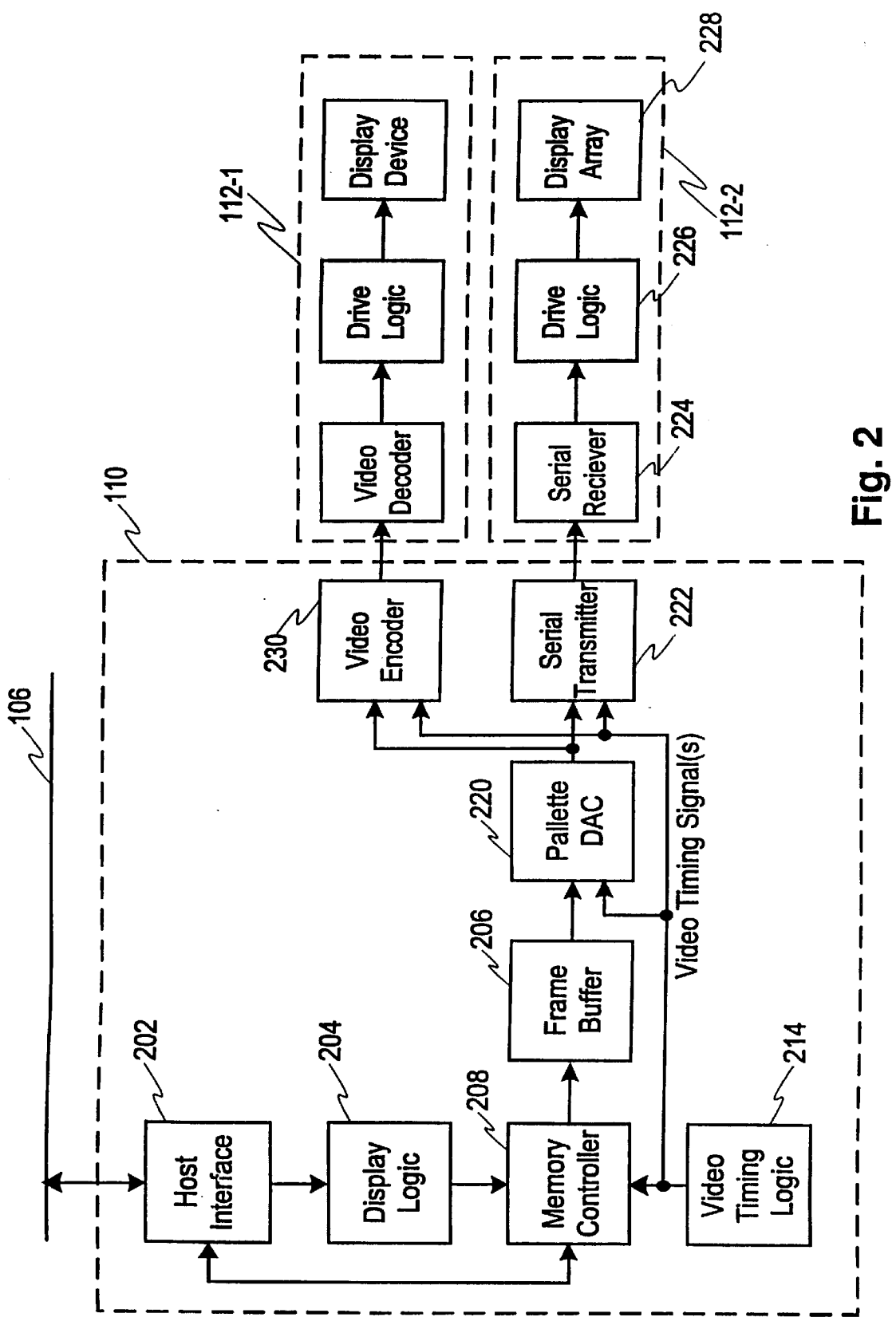
FIG. 2 is a functional block diagram of the display subsystem of FIG. 1.

An example of the display subsystem 110 is shown in FIG. 2. More specifically, the exemplary display subsystem 110 includes a control processor 200 that supervises the operation of the display subsystem 110. The control processor 200 controls the operations performed by the other elements of the display subsystem 110. The display subsystem 110 attaches to the system bus 106 via a host interface 202, which reads and writes data from and to the system bus 106 by performing the communication protocol of the system bus 106.

The display subsystem includes display logic 204 that performs the operations dictated by the commands received via the system bus 106 to generate image data for display on the display device. The display logic 204 may include a microprocessor or may include special purpose hardware for performing a specific class of operations.

The image data generated by the display logic 204 is stored in a frame buffer 206 under control of a memory controller 208. In addition, the contents of the frame buffer 206 can be read back and transferred to the system control processor 102 via the memory controller 208 and host interface 202.

The frame buffer 206 typically contains sufficient memory to store color data for each pixel of the display device 112. Conventionally, the color data consists of three sets of bits (for example, 38-bit integers) representing red, green and blue (r,g,b) colors for each pixel. Conventionally, the frame buffer 206 is arranged in a matrix of rows and columns each n bits deep wherein the particular row and column address corresponds to the pixel location on the display device 112. In addition, the display subsystem 110 may include two frame buffers. As in conventional, one of the frame buffers serves as the active display portion, while the other frame buffer is updated for subsequent display. Either frame buffer may change from being active to inactive in accordance with the needs of the system 100; the particular manner in which the changeover is accomplished is not relevant to the present invention.

The display subsystem 110 also includes video timing logic 214 that generates video timing signals that controls the transfer of pixel data from the frame buffer 206 to the display device 112. More specifically, the video timing logic 214 generates a pixel clock signal, a horizontal synchronization signal (or HSYNCH signal) and a vertical synchronization signal (VSYNCH). The pixel clock signal represents the transition between pixels in a given line of the display. The HSYNCH signal represents the transition from one line to another line of the display device, and the VSYNCH signal represents the transition from one frame (i.e., the last line of a frame) to the next frame (i.e., the first line of the next frame) of the display device.

The video timing logic 214 includes a set of control registers that control the frequency of the pixel clock, HSYNCH and/or VSYNCH signals. The set of control registers typically include a pair of registers, which may be denoted Reg1 and Reg2 for descriptive purpose, where the values stored in Reg1 and Reg2, control the frequency of the pixel clock signal generated by the video timing logic 214 based upon a predetermined equation. For example, the values of Reg1 and Reg2 may vary the frequency f of the pixel clock signal according to the following equation:

$$f=[(\text{Reg1}+8)/(\text{Reg2}+2)]*R$$

where R is a multiplication factor

In addition, the set of control registers typically includes a register, which may be denoted HT for descriptive purposes, that controls the frequency of the HSYNC signal generated by the video timing logic 214, and includes a register, which may be denoted VT for descriptive purposes, that controls the frequency of the VSYNC signal generated by the video timing logic 214.

In computer systems, two (or more) predetermined sets of values to be stored in the set of control registers are typically stored in the video/display BIOS of the computer system. Because 1) space allocated to video/display BIOS code is constrained and 2) many register values for each mode must be stored in the video/display BIOS code, only a limited number of refresh rate choices are offered. During system setup, an active set of values is selected from the stored set of values and the active set is written to the control registers.

The video timing signals are provided to memory controller 208, which generates an address signal based upon such video timing signals supplied thereto. The address signals generated by the memory controller 208 are provided to the frame buffer 206 to cycle through the pixel locations of the frame buffer 206. In each address cycle, the pixel data for one or more pixels is read from the frame buffer 206 and transferred to a palette DAC 220.

The palette DAC 220 maps the pixel data output from the frame buffer 206 to a color space (which, for example, may be a 24 bit integer value) used on the display. Preferably, the palette DAC 200 utilizes a table look-up that operates synchronously with the pixel clock signal generated by the video timing logic 214.

In most image display systems (e.g., desktop computer systems), the palette DAC 220 forwards the transformed pixel data to a video encoder 230 that encodes the transformed pixel data into a video signal, such as an NTSC signal, MPEG video signal or HDTV signal, for output to a video device 112-1, such as a CRT monitor. The video device 112-1 includes a decoder, drive logic and a display that decodes the video signal and displays the image represented by the pixel data encoded therein.

In some image display systems (e.g., notebook computers), the palette DAC 220 forwards the transformed pixel data, typically one pixel at a time, to a serial link transmitter 222. The serial link transmitter 222 receives the pixel data, serializes the pixel data into a bit stream, and transfers the bit stream to a display device 112-2 over a high speed serial channel. The display device 112-2 includes a serial link receiver 224 that receives the bit stream. Preferably, the serial link transmitter 222 and receiver 224 operate synchronously with the pixel clock signal generated by the video timing logic 214. An example of the serial link transmitter 222 and receiver 224 is the DS90CR383/DS90CR284 channel link manufactured by National Semiconductor. In addition, the signals communicated between the serial link transmitter 222 and receiver 224 preferably include a clock signal generated by the serial link transmitter 222 that is derived from the pixel clock signal generated by the video timing logic 214. The serial link receiver 224 utilizes the clock signal communicated between the serial link transmitter 222 and receiver 224 to reconstruct the pixel clock signal. For example, the clock signal communicated between the serial link transmitter 222 and receiver 224 may be the pixel clock signal stepped down by a factor of $2^N$ (where N is an integer greater than or equal to 0).

The serial receiver 224 recovers the pixel data from the serial bit stream, and forwards the pixel data to drive logic 226. In addition, the serial link receiver 224 utilizes the clock signal communicated between the serial link transmitter 222 and receiver 224 to reconstruct the pixel clock signal, and forwards the pixel clock signal to the drive logic 226. The drive logic 226 utilizes the pixel clock signal and pixel data received from the serial link receiver 224 to generate signals supplied to a display array 228 to thereby generate an image for display.

According to the present invention, a software mechanism is provided that adjusts the frequency of at least one video timing signal of the display subsystem in response to detection that the image display system is switching between power modes.

More specifically, the image display system includes a mechanism that detects that the system is switching between AC-powered operation and DC-powered operation. During AC-powered operation, the system is supplied with power from an AC power source, which is converted into a DC power source suitable for use by the system. During DC-powered operation, the system is supplied with power from a DC power source such as a battery (and the AC power source is disconnected from the system). The DC power source is converted into a DC power source suitable for use by the system.

Upon detecting that the image display system is switching between power modes, the system executes a series of instructions that adjusts the frequency of at least one video timing signal of the display subsystem. The series of instructions preferably adjusts the frequency of the pixel clock signal of the display subsystem by first generating a new value for the control registers of the video timing logic 214 that controls the frequency of the pixel clock signal, and then writing the new values into such control registers. The new values that are generated and written into the control registers of the video timing logic 214 that control the frequency of the pixel clock signal may be, or may not be, based upon the current value of such control registers.

For example, consider the exemplary embodiment described above where the values stored in control registers Reg1, Reg2 of the video timing logic 214 controls the frequency of the pixel clock signal. In this embodiment, upon detecting that the system is switching from AC-powered operation to DC-powered operation, the system preferably executes a series of instructions that adjusts the frequency of the pixel clock signal of the display subsystem by first generating a new value for one (or both) of the control registers Reg1 and Reg2, and then writing the new value(s) into such control registers Reg1, Reg2. The new values that are generated and written into Reg1, Reg2 for DC-powered operation preferably decreases the frequency of the pixel clock signal (when compared to the pixel clock signal during AC-powered operation).

Importantly, decreasing the frequency of the pixel clock signal results in significant power savings by decreasing the power consumed by the frame buffer 206, the palette DAC 220, the serial-link transmitter 222, serial-link receiver 224, drive logic 226, video encoder 230, etc. Typically, the time that the system will operate under DC-power is constrained, and can be extended by lowering the power consumption of the system. The present invention may be used to extend the time that the system will operate under DC-power by decreasing the frequency of the pixel clock signal in response to detecting that the system is switching from AC-powered operation to DC-powered operation.

The new values that are generated and written into Reg1, Reg2 for DC-powered operation may be (or may not be) based upon the value of such control registers during AC-powered operation. Moreover, the new values that are generated and written into Reg1, Reg2 for DC-powered operation may be (or may not be) selected from a predetermined set of values stored by the system.

Typically, the values stored in Reg1 and Reg2 are integer values less than or equal to $2^n$, where n is the number of bits in the registers Reg1/Reg2. An iterative approach is preferably used to calculate the values that are to be written into Reg1, Reg2 for DC-powered operation. An exemplary brute force method for this calculation follows:

1) initialize a variable Reg2 to the lowest value that can be written into Reg2, which is typically 0;
2) identify a target frequency F of the pixel clock signal;
3) solve for Reg1 using the equation that characterizes the relationship of the frequency f of the pixel clock signal with the values stored in Reg1, Reg2; consider the example above where $f=[(Reg1+8)/(Reg2+2)]*R$; in this case, Reg1 can be determined as follows: Reg1= $[F(Reg2+2)/R]$ 8; 4) round the value of Reg1 to the nearest integer value; 5) using the values for Reg1, Reg2 determined above, calculate the frequency f of the pixel clock signal using the equation that characterizes the relationship of the frequency f of the pixel clock signal with the values stored in Reg1, Reg2; in the example above, $f =[(Reg1+8)/(Reg2+2)]*R$;
6) determine the difference between the frequency f generated in step 5 with the target frequency F; if this difference is minimal with respect to the previously stored candidate set of values, the values of Reg1 and Reg2 are stored as the candidate set of values;
7) increment the variable Reg2 and return to step 1 to repeat the process until the maximal value of Reg2 has been reached.

In this exemplary embodiment, upon detecting that the ystem is switching from DC-powered operation to AC-powered operation, the system preferably executes a series of instructions that adjusts the frequency of the pixel clock signal of the display subsystem by first generating a new value for one or both) of the control registers Reg1 and Reg2, and then writing the new value(s) into such control registers Reg1, Reg2. The new values that are generated and written into Reg1, Reg2 for AC-powered operation preferably increases the frequency of the pixel clock signal (when compared to the pixel clock signal during DC-powered operation). As described above, it is advantageous under DC-powered operation to decrease the frequency of the pixel clock signal results to thereby decrease the power consumed by the frame buffer 206, the palette DAC 220, the serial-link transmitter 222, serial-link receiver 224, drive logic 226, etc. However, during AC-powered operation, the time that the system will operate under AC-power is not constrained (unless interrupted by a power failure), and power savings is not necessary.

The new values that are generated and written into Reg1, Reg2 for AC-powered operation may be (or may not be) based upon the value of such control registers during DC-powered operation. Moreover, the new values that are generated and written into Reg1, Reg2 for AC-powered operation may be (or may not be) selected from a predetermined set of values stored by the system. In general, the values that are generated and written into Reg1, Reg2 for AC-powered operation will represent the highest possible refresh rate which the hardware is capable of sustaining in order to minimize motion effects.

Modern day notebook computer systems typically execute a series of instructions when a transition between AC-powered operation and DC-powered operation is detected. For example, the series of instructions may cause the backlight of the display device to be lowered, cause the hard disk drive of the system to be powered down if not accessed for some time, etc. In such systems, the series of instructions described above that adjust the video timing signal(s) of the display subsystem is preferably added to this sequence of instructions to thereby improve power savings when the system is operating under DC-power.

In addition, the series of instructions described above that adjust the video timing signal(s) of the display subsystem may be activated in response to user interaction with a physical button and/or in response to user interaction with a graphical user interface (for example, a menu button that is part of a display setup utility).

Moreover, the series of instructions described above that adjust the video timing signal(s) of the display subsystem is preferably implemented as a software routine that is stored in persistent storage, such as a fixed disk drive or other non-volatile memory, and loaded into the system memory 100 from persistent storage for execution by the system control processor 102. The software routine may be part of an application program (such as a system utility) or integrated into the device driver.

Importantly, the present invention adjusts the video timing signal(s) of the display subsystem when the system is operating under DC-power to thereby decrease the power consumed by the frame buffer 206, the palette DAC 220, the serial-link transmitter 222, serial-link receiver 224, drive logic 226, etc. Typically, the time that the system will operate under DC-power is constrained, and can be extended by lowering the power consumption of the system. We have seen reasonable performance for refresh rates below 10 Hz on some TFT/LCD display systems though this value is highly dependent on the display system electronics and the physical properties of the TFT/LCD matrix itself. In addition the minimum refresh rate would also vary for other display technologies.

Although the invention has been shown and described with respect to the particular embodiment(s) thereof, it should be understood by those skilled in the art that the foregoing and various other changes, omissions, and additions in the form and detail thereof may be made without departing from the spirit and scope of the invention.

We claim:

1. A program storage device for use in an image display system, said image display system having a Basic Input Output System (BIOS), a display subsystem that generates pixel data and a pixel clock signal for output to a display device, at least one control register, each containing a value to define a frequency of said pixel clock signal in accordance with a predefined mathematical equation, and a mechanism for detecting that the system is switching between power modes, the program storage device tangibly embodying a series of instructions executable by the system to perform method steps for controlling said pixel clock signal, the method steps comprising:

in response to detection that the system is switching between power modes, adjusting said pixel clock signal by generating a new value for one or more of said at least one control register, wherein said generating a new value is not a selection of one or more values pre-stored in said BIOS.

2. The program storage device of claim 1, wherein the adjusting step updates said pixel clock signal such that the system conserves power in response to detection that the system is switching from AC-powered operation to limited DC-powered operation.

3. The program storage device of claim 2, wherein the adjusting step updates the frequency of said pixel clock signal.

4. The program storage device of claim 1, wherein the adjusting step is activated in response to user interaction with one of a physical button and a graphical user interface.

5. The program storage device of claim 1, where the series of instructions is stored in persistent storage and loaded into memory from persistent storage for execution by the system.

6. The program storage device of claim 5, wherein the series of instructions is part of an application program.

7. The program storage device of claim 1, wherein the series of instructions is part of a device driver.

8. A program storage device for use in an image display system having a display subsystem that generates pixel data and a pixel clock for output to a display device and a mechanism for detecting that the system is switching between power modes, the program storage device tangibly embodying a series of instructions executable by the system to perform method steps for controlling said pixel clock, the method steps comprising:

in response to detection that the system is switching between power modes, adjusting said pixel clock signal, wherein said adjusting step updates said pixel clock signal such that the system conserves power in response to detection that the system is switching from AC-powered operation to limited DC-powered operation by reducing a frequency of said pixel clock signal, or such that the system leaves a power conserving mode in response to detection that the system is switching from limited DC-powered operation to AC-powered operation by increasing the frequency, wherein the frequency of said pixel clock signal is controlled by said subsystem using a numerical value stored in at least one control register to calculate a value for the frequency in accordance with a predefined mathematical equation, and wherein said adjusting step updates the frequency of the pixel clock signal by calculating a new value for said numerical value.

9. The storage program device of claim 8, wherein said calculation comprises an iterative process.

10. An image display system comprising:

a Basic Input Output System (BIOS) embedded in a Read Only Memory ROM;

a display subsystem that generates pixel data and a pixel clock signal for output to a display device, said display subsystem having at least one control register, each containing a value to define a frequency of said pixel clock signal in accordance with a predefined mathematical equation;

means for detecting that the system is switching between power modes; and a program storage device tangibly embodying a series of instructions executable by the system to perform method steps for controlling said pixel clock signal, the method steps comprising, in response to detection that the system is switching between power modes, adjusting a value for a parameter controlling said pixel clock signal, wherein said adjusting does not comprise or result in a selection of one or more values stored in said BIOS to be loaded into one or more of said at least one control register.

11. The system of claim 10, wherein the adjusting step updates said pixel clock signal such that the system conserves power in response to detection that the system is switching from AC-powered operation to limited DC-powered operation.

12. The system of claim 11, wherein the adjusting step updates the frequency of said pixel clock signal.

13. The system of claim 10, wherein the adjusting step is activated in response to user interaction with one of a physical button and a graphical user interface.

14. The system of claim 10, where the series of instructions is stored in persistent storage and loaded into memory from persistent storage for execution by the system.

15. The system of claim 14, wherein the series of instructions is part of an application program.

16. The system of claim 14, wherein the series of instructions is part of a device driver.

17. An image display system comprising:

a display subsystem that generates pixel data and a pixel clock signal for output to a display device;

means for detecting that the system is switching between power modes; and a program storage device tangibly embodying a series of instructions executable by the system to perform method steps for controlling said pixel clock signal, the method steps comprising, in response to detection that the system is switching between power modes, adjusting said pixel clock signal, wherein the adjusting step updates said pixel clock signal such that the system conserves power in response to detection that the system is switching from AC-powered operation to limited DC-powered operation or that the system terminates a power conservation mode in response to detection that the system is switching from said limited DC-powered operation to AC-powered operation, wherein the adjusting step updates the frequency of said pixel clock signal, wherein the frequency of said pixel clock signal is controlled by a numerical value stored in at least one control register, said numerical value used by said display subsystem to calculate said frequency in accordance with a predefined mathematical equation, and wherein the adjusting step updates the frequency of the pixel clock signal by calculating a new value for said numerical value stored in said at least one control register.

18. The system of claim 17, wherein said calculation comprises an iterative process.

\* \* \* \* \*